US008011516B2

(12) United States Patent
Berdelle-Hilge

(10) Patent No.: US 8,011,516 B2
(45) Date of Patent: Sep. 6, 2011

(54) METHOD AND DEVICE FOR SORTING OBJECTS

(75) Inventor: Peter Berdelle-Hilge, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 12/396,055

(22) Filed: Mar. 2, 2009

(65) Prior Publication Data

US 2009/0218261 A1 Sep. 3, 2009

(30) Foreign Application Priority Data

Feb. 29, 2008 (DE) ......................... 10 2008 012 027

(51) Int. Cl.
*G06K 9/00* (2006.01)

(52) U.S. Cl. ......... 209/552; 209/584; 209/651; 209/900

(58) Field of Classification Search .................. 209/584, 209/900; 198/358, 370.05, 370.06, 890
See application file for complete search history.

(56) References Cited

U.S. PATENT DOCUMENTS

| | | | | |
|---|---|---|---|---|
| 4,977,996 | A * | 12/1990 | Duce | 198/349.95 |
| 5,353,912 | A | 10/1994 | Killer et al. | |
| 5,462,268 | A | 10/1995 | Remy et al. | |
| 5,994,657 | A * | 11/1999 | Maier et al. | 209/584 |
| 6,189,702 | B1 * | 2/2001 | Bonnet | 209/651 |
| 6,501,041 | B1 | 12/2002 | Burns et al. | |
| 6,505,730 | B1 | 1/2003 | Linder | |
| 6,644,461 | B1 | 11/2003 | Imbert et al. | |
| 7,235,756 | B2 * | 6/2007 | De Leo et al. | 209/584 |
| 7,397,010 | B2 | 7/2008 | Wilke | |
| 7,411,146 | B2 * | 8/2008 | Hanson et al. | 209/584 |
| 2004/0200761 | A1 | 10/2004 | Hanson et al. | |
| 2005/0173312 | A1 * | 8/2005 | Hanson | 209/584 |
| 2005/0205473 | A1 | 9/2005 | Mileaf | |
| 2005/0218046 | A1 | 10/2005 | Mileaf et al. | |
| 2005/0222708 | A1 | 10/2005 | Wisniewski | |
| 2006/0102529 | A1 * | 5/2006 | Wilke | 209/584 |
| 2006/0259185 | A1 | 11/2006 | Berdelle-Hilge | |
| 2006/0278501 | A1 | 12/2006 | Sweazy | |
| 2007/0090027 | A1 * | 4/2007 | Haselberger et al. | 209/584 |
| 2007/0203612 | A1 * | 8/2007 | Mileaf | 700/216 |
| 2008/0060981 | A1 * | 3/2008 | Skrdlant et al. | 209/552 |
| 2009/0050541 | A1 * | 2/2009 | Berdelle-Hilge | 209/584 |
| 2009/0060698 | A1 * | 3/2009 | Enenkel | 414/592 |

FOREIGN PATENT DOCUMENTS

DE 10305847 B3 8/2004

(Continued)

*Primary Examiner* — Terrell H Matthews
(74) *Attorney, Agent, or Firm* — Laurence A. Greenberg; Werner H. Stemer; Ralph E. Locher

(57) ABSTRACT

An apparatus and a method for sorting objects. The apparatus has an input conveyor, an output conveyor, two loading devices, two unloading devices and a drive. Each loading device is configured to fill the input conveyor with at least one object. Each unloading device enables an object to be removed from the output conveyor. The apparatus can be switched between an input optimized mode and an output optimized mode. In the input optimized mode, both loading devices and one unloading device are activated. The apparatus guides the input conveyor past both loading devices and the output conveyor past the activated unloading device. In the output optimized mode, one loading device and both unloading devices are activated. The apparatus guides the input conveyor past the activated loading device and the output conveyor past the two unloading devices.

15 Claims, 3 Drawing Sheets

FOREIGN PATENT DOCUMENTS

| | | | |
|---|---|---|---|
| DE | 10 2004 033 564 | B3 | 3/2006 |
| DE | 102005055763 | B3 | 4/2007 |
| DE | 102006041253 | A1 | 3/2008 |
| EP | 1500440 | B1 | 3/2008 |
| WO | 2004071680 | A1 | 8/2004 |
| WO | 2005025764 | A1 | 3/2005 |
| WO | 2005051556 | A2 | 6/2005 |
| WO | 2006029212 | A2 | 3/2006 |
| WO | 2006/100598 | A1 | 9/2006 |
| WO | 2006100589 | A1 | 9/2006 |
| WO | 2006100592 | A1 | 9/2006 |
| WO | 2006100594 | A1 | 9/2006 |
| WO | 2006100598 | A1 | 9/2006 |
| WO | 2006100599 | A1 | 9/2006 |
| WO | 2006100600 | A2 | 9/2006 |
| WO | 2006100601 | A1 | 9/2006 |
| WO | 2006100604 | A1 | 9/2006 |

* cited by examiner

METHOD AND DEVICE FOR SORTING OBJECTS

BACKGROUND OF THE INVENTION

Field of the Invention

The invention relates to an apparatus and a method for sorting objects, in particular addressed mail items.

A sorting apparatus for mail items is described in WO 2006/100598 A1. This sorting apparatus has an endless pocket conveying path with many storage pockets, a loading device for loading the storage pockets, and an endless output conveying path. The overlap is of U-shape.

DE 10 2004 033 564 B3 describes a sorting device for mail flats. An endless pocket conveying path comprises storage pockets that are carried past one or more loading stations. Located beneath these storage pockets is an endless output conveying path with upwardly open output containers.

U.S. Pat. No. 6,501,041 B1 describes a sorting system for mail items that has a plurality of input devices in the form of "infeed stations", a conveyor, a multiplicity of discharge funnels ("chutes") and a plurality of horizontal conveyor belts. The conveyor belts are guided past below the discharge funnels. The conveyor transports mail items past the discharge containers. Depending on a sorting plan, each mail item passes respectively into a discharge funnel and falls through this funnel into a container that stands on a conveyor belt. The container transports mail items back to the input device.

BRIEF SUMMARY OF THE INVENTION

It is the object of the invention to provide an apparatus having the features of the preamble of claim 1, and a method having the features of the preamble of claim 11, that can be used both for sorting with the aid of one sorting run, and for sorting with the aid of a plurality of sorting runs.

The object is achieved by an apparatus having the features of claim 1, and a method having the features of claim 11. Advantageous refinements are specified in the subclaims.

The apparatus according to the solution comprises an input conveyor, an output conveyor, at least two loading devices, at least two unloading devices, and a drive.

Each loading device is configured to fill the input conveyor with at least one object when the input conveyor is guided past the loading device.

The input conveyor is configured to transport at least one object from a loading device to the transfer area.

The drive is configured to move the input conveyor relative to the output conveyor. The input conveyor and the output conveyor overlap one another in at least one transfer area in such a way that an object to be sorted can be transferred from the input conveyor into the or onto the output conveyor.

The output conveyor is configured to transport at least one object from the transfer area to one of the unloading devices.

Each unloading device is configured to enable at least one object that is located in the or on the output conveyor to be removed from the output conveyor.

The apparatus can be switched between an input optimized and an output optimized mode. In the input optimized mode, both loading devices and one unloading device are activated. In the output optimized mode, one loading device and both unloading devices are activated.

If the apparatus is operated in the input optimized mode, the apparatus is configured as follows: the drive is capable of guiding the input conveyor past both loading devices and the output conveyor past the activated unloading device.

If the apparatus is operated in the output optimized mode, the apparatus is configured as follows: the drive is capable of guiding the input conveyor past the activated loading device and the output conveyor past both unloading devices.

The solution according to the invention enables switching between the input optimized and the output optimized modes without undertaking structural modifications to the apparatus. If the apparatus sorts the objects in a plurality of sorting runs, the apparatus is operated for this purpose in the input optimized mode. A plurality of sorting runs are necessary if the objects are to be sorted according to more sorting classes than the sorting system has sorting outputs. In this case, in each sorting run, objects of different sorting classes are discharged into the same sorting output. After the last sorting run, the objects are sorted in each sorting output in accordance with a prescribed sequence among sorting classes.

If the apparatus sorts the objects in a single sorting run, the apparatus is operated for this purpose in the input optimized mode. For example, objects of different dimensions are to be brought into a sequence in one sorting run, for which purpose a sequence among sorting classes is prescribed. It is therefore possible to use the same system for various sorting tasks. The invention spares the necessity of using a new system for each sorting task.

Two loading devices and two unloading devices are used in the case of the sorting method according to the solution. The sorting is carried out optionally in an input optimized mode or in an output optimized mode.

The following steps are carried out in the input optimized mode:

Both loading devices and one unloading device (E1) are already or are now activated.

The input conveyor is guided past both loading devices (B1, B2).

Each object to be sorted is passed from one of the loading devices into the or onto the input conveyor.

The input conveyor transports the object to be sorted to a transfer area.

The object to be sorted is passed in the transfer area from the input conveyor onto or into the output conveyor.

The output conveyor is guided past the activated unloading device.

The output conveyor guides the object to be sorted past the activated unloading device.

The object to be sorted is removed from the output conveyor when the object is guided past the unloading device.

The following steps are carried out in the output optimized mode:

One loading device and both unloading devices are already or are now activated.

The input conveyor is guided past the activated loading device.

Each object to be sorted is passed from the activated loading devices into the or onto the input conveyor.

The input conveyor transports the object to be sorted to a transfer area.

The object to be sorted is passed in the transfer area from the input conveyor onto or into the output conveyor.

The output conveyor is guided past both unloading devices.

The object to be sorted is removed from the output conveyor when the object is guided past an unloading device.

The input conveyor preferably comprises a plurality of holding components. Each holding component is capable of holding respectively at least one object. The output conveyor comprises a plurality of receiver components. Each receiver component is capable of receiving respectively at least one object. In one configuration, the apparatus with the holding components and the receiver components is configured such that the following is effected:

in the input optimized mode on its way from each loading device to each other loading device each holding component passes at least once in relation to each receiver component into a transfer position in which each object can be transferred from this holding component into this receiver component and in the output optimized mode on its way from one unloading device to each other unloading device each receiver component passes in relation to each holding component at least once into the transfer position.

This configuration ensures that in the input optimized mode each object can be passed from each loading device into any desired storage pocket and be passed from there into any desired output container. Moving an available storage pocket longer than required without filling it, because it is not guided past the correct loading device, is avoided.

In the output optimized mode, this configuration ensures that each object can be passed into any desired output container and from there to each of the two unloading devices.

it is thereby rendered possible to feed the objects in any desired sequence via the loading devices to the input conveyor, and yet to produce in each receiver component respectively one stack of objects with a specific feature. The feature can, for example, be a delivery point to which the object is to be transported, the object being provided with data relating to this delivery point, and the sorting system reading and decoding this delivery point datum. All the objects to the same delivery point—or objects sorted by delivery point—are located in each receiver component, for example each output container. It is possible to produce a specific sequence among the receiver components and thus among the objects. The objects in the same receiver component can have different dimensions. For example, it becomes possible to sort mail items to the route of a mail deliverer (“delivery point processing”).

The input conveyor comprises, for example, holding components in the form of storage pockets that are mounted on a pocket holding device. Each storage pocket is configured to buffer at least one object to be sorted such that the object to be sorted can be transported in this storage pocket up to the transfer area. Each loading device is configured to fill a storage pocket guided past the loading device with at least one object.

In another refinement, the input conveyor comprises clamps (more generally “escorts”) or similar holding devices that are mounted on a clamp holding unit. Each clamp is configured to hold at least one object to be sorted, such that the object can be transported as long as it is held by the clamp. Each loading device is configured such that respectively at least one object is gripped by a holding device. The holding devices can all be the same, or can depend on the size of the object respectively to be held.

The input conveyor can also comprise an endless conveyor belt or a series of endless conveyor belts. Objects to be sorted are laid onto a conveyor belt and transported by the rotating conveyor belt. In the transfer area, an input conveyor that is assembled from a series of endless conveyor belts transfers an object onto the output conveyor in one of the following ways:

The conveyor belts are guided around vertical rollers and transport an object that they have clamped between them. A sorting gate discharges an object, and a transport path guides the object to the output conveyor.

The conveyor belts are guided around horizontal rollers. A conveyor belt transfers an object to the output conveyor by virtue of the fact that the conveyor belt is tilted, and the object slides from the conveyor belt onto the output conveyor.

Tilting trays are mounted on the horizontal conveyor belt or belts. Respectively at least one object is laid into each tilting tray, and the tilting tray is tilted in the transfer area, the result being that the object slides onto the output conveyor.

The output conveyor comprises output containers in one refinement. Each output container can be filled with at least one object. The output conveyor can also comprise a series of conveyor belts, or a conveyor belt subdivided into segments. Either the objects are transported lying directly on these conveyor belts, or the conveyor belts transport containers with these objects. Each object is assigned to at least one sorting class.

Each loading device is configured in one embodiment to the effect that respectively one holding component grips an object to be sorted. The input conveyor transports the holding component up to the transfer area. In another embodiment, a flow of spaced apart objects reaches one or each input device. The input device has the effect that respectively one object is passed into a storage pocket.

At least one feature is preferably prescribed. A measuring device measures each object and measures which value the feature assumes for this object. The feature is, for example, data relating to a delivery point to which the object is to be transported. The sorting system passes each object as a function of the feature value of this object into a receiver component of the output conveyor or onto a specific place in the output conveyor.

In one embodiment, the apparatus is configured to enable each removal location to remove an output container carried past the removal location from the output conveyor. For example, an automatic handling system or a worker removes a filled output container from the output conveyor and passes the output container onto, for example, a conveyor belt or directly into a transport vehicle.

In an alternative embodiment, the apparatus is configured to enable each removal location to remove an object from an output container carried past the removal location.

The input conveyor preferably transports the objects in the input optimized mode via a longer conveying path than in the output optimized mode. The input optimized conveying path is guided past both loading devices, while the output optimized conveying path is guided only past the one loading device that is activated in the output optimized load. This enables an unrequired conveying path or loading device to be temporarily shut down and, for example, the undertaking of repairs or maintenance work.

The output conveyor correspondingly transports the objects in the output optimized mode over a longer conveying path than in the input optimized mode, specifically past both unloading devices.

The sorting system is preferably initially operated in the input optimized mode, and subsequently in the output optimized mode. In the input optimized mode, objects are rapidly fed to the sorting system via the two activated loading devices. In the subsequent output optimized mode, the sorting system discharges the objects rapidly into the two activated unloading devices. This refinement saves time.

The invention is described below with the aid of an exemplary embodiment. In the drawings:

DESCRIPTION OF THE INVENTION

In the exemplary embodiment, the apparatus is used to sort mail flats. Each mail item is provided with data relating to one delivery address in each case.

Figure 1:
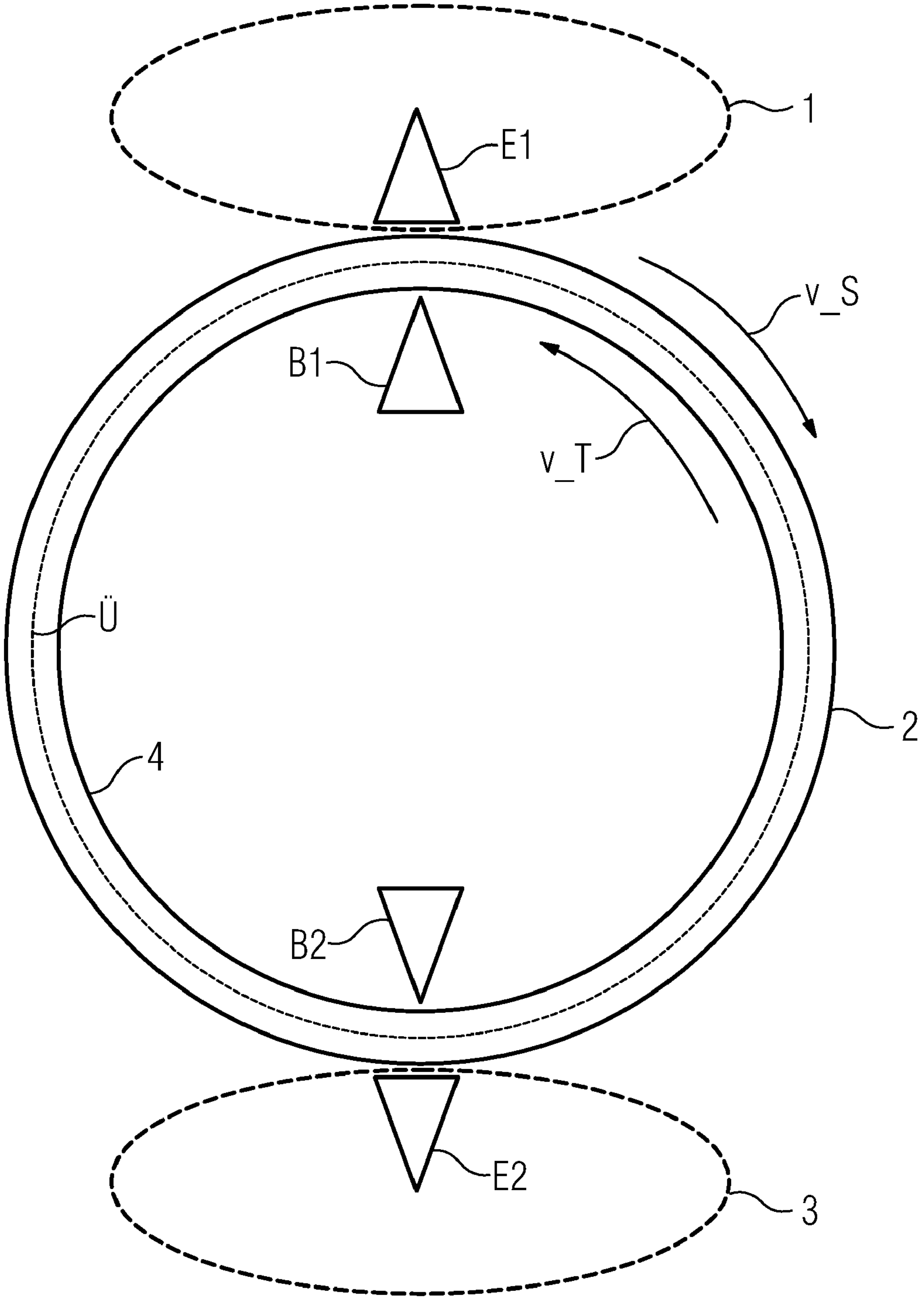
FIG. 1 is a schematic of the apparatus of the exemplary embodiment.

FIG. 1 is a schematic of the apparatus of the exemplary embodiment. This apparatus has an input conveyor in the form of a pocket conveying path 4.

In the schematic of FIG. 1, the pocket conveying path 4 is illustrated as a circle. Also possible as a configuration of the pocket conveying path 4 is any other shape of a closed curve, for example the shapes illustrated in WO 2006/100598 A1 and illustrated there in FIG. 4 and FIG. 12.

A multiplicity of holding components in the form of storage pockets are fitted on an endless pocket holding device of the pocket conveying path 4. Each storage pocket is configured to remove at least one mail item.

The storage pockets thus run on an endless path over the entire pocket conveying path 4. It is also possible to use clamps or other suitable holding devices instead of the storage pockets. Such a holding component is capable of receiving mail items of various dimensions, and saves the need of the mail items to be stacked and to be separated or rerouted.

"Storage pocket" denotes any type of container that can be filled with a mail item, and from which the mail item can be removed again.

Each storage pocket preferably has a flap that is let into the bottom or into a side wall, as well as an actuating system that is capable of opening and closing the flap under control. The storage pocket is open at the top. A mail item is introduced into the storage pocket from above through the opening, the flap being closed and the mail item sliding into the storage pocket through its own gravity. The storage pocket is emptied by opening the flap, the result being that the mail item falls downwards out of the storage pocket.

The apparatus further has an output conveyor. In the schematic of FIG. 1, this output conveyor comprises a circular segment 2 and two oval segments 1 and 3.

In the plan view of FIG. 1, the segment 2 of the output conveyor, and the pocket conveying path 4 are shown and described as concentric circles. The pocket conveying path 4 is located obliquely or perpendicularly above the segment 2.

A large number of output containers are fitted onto or on an endless output container holding device. Each output container is capable of receiving a plurality of mail items. The output container is preferably capable of receiving mail items owing to the fact that the mail items are stacked in the output container to form a horizontal or vertical stack. The output container can, for example, be configured as a container with a bottom and a plurality of side walls. In an alternative refinement, the output conveyor comprises at least one horizontal endless conveyor belt with a large number of segments. Mail items are laid horizontally onto a segment. Each segment is assigned to a sorting class, for example a delivery address.

The output conveyor can comprise a holding device in the form of an endless conveyor belt onto which output containers are placed. It is possible for the empty output containers to be placed loosely on the conveyor belt, or to be connected temporarily to the conveyor belt, be filled with mail items, and be taken from the conveyor belt again later. It is also possible to mount permanently on the conveyor belt receiver devices that function as receiver containers. Each receiver device respectively preferably receives a stack of mail items. The receiver device is capable of outputting again the received stack of mail items, for example by virtue of the fact that the output container is tilted and the stack slides into another container.

The apparatus is configured to transfer a mail item from a storage pocket into an output container. In the exemplary embodiment, the storage pocket is brought for this purpose into a transfer position in which it is located perpendicularly or obliquely over the output container. The flap is opened. The mail item falls into the output container by gravity. It is possible for the storage pocket and/or the output container to have a guiding means that guides the mail item into a desired position in the output container.

In the exemplary embodiment, the pocket conveying path 4 and the output conveying path 1, 2, 3 overlap one another in a transfer area Ü. In this transfer area Ü, the pocket conveying path 4 runs perpendicularly or obliquely above the output conveying path. A storage pocket and an output container can pass in this transfer area Ü into a transfer position in which a mail item can slide from the storage pocket into the output container. The storage pocket is then located perpendicularly or obliquely over the output container. In the exemplary embodiment, the transfer area Ü comprises the two concentric circles 2 and 4 of FIG. 1, that is to say the segment 2 of the output conveying path and the pocket conveying path 4.

The output containers of the output conveying path 1, 2, 3 optionally traverse a section comprising all three partial segments 1, 2, 3 of the output conveying path, or a section comprising only the segment 2, or the segments 2 and 1, or the segments 2 and 3.

A drive of the apparatus acts both on the pocket conveying path 4 and on the output conveying path 1, 2, 3, and is capable of moving both conveyors and the storage pockets and output containers located on them. The speed $v_S$ at which the drive moves the output container holding device, and at which the output containers are moved over the output conveying path 1, 2, 3 can be set to one of a plurality of possible values, just like the speed $v_T$ at which the storage pockets are moved over the pocket conveying path 4. The two speeds $v_s$, $v_T$ can be set independently of one another.

The apparatus can be switched between an input optimized mode and an output optimized mode. In one embodiment, when the apparatus is operated in the input optimized mode the drive moves both holding devices at the same speed $v\_T(e)=v\_S(e)$ and in opposite directions. Both the storage pockets and the output containers are therefore moved at a speed of $v\_T(e)=v\_S(e)$ above ground, specifically in opposite directions. The storage pockets in this case traverse the complete pocket conveying path 4, that is to say the circle in FIG. 1. The output containers traverse the segment 2 of the output conveying path. The segments 1 and 3 are not used in the input optimized mode.

If the apparatus is operated in the output optimized mode, the output containers traverse the entire output conveying path, that is to say the segments 1, 2 and 3 in the example of FIG. 1. The storage pockets traverse the pocket conveying path 4 exactly as in the case of the input optimized mode. The drive once again moves the two holding devices in opposite directions such that the storage pockets and the output containers are moved in opposite directions.

Let v_T(a) be the speed of the storage pockets over ground, and v_S(a) the speed of the output containers over ground in the output optimized mode. A specific storage pocket and a specific output container preferably always meet one another at the same location. Because the path of an output container is longer than the path of a storage pocket, the output containers are moved more rapidly than the storage pockets. Let L_1, L_2, L_3 be the lengths of the three segments 1, 2, 3 of the output conveying path. L_2 is approximately simultaneously the length of the transfer area Ü and the length of the pocket conveying path 4. It then holds that $$v\_S(a) = \frac{L\_1 + L\_2 + L\_3}{L\_2} * v\_T(a).$$

The apparatus further has two loading devices B1, B2 and two unloading devices E1, E2. Each loading device is preferably configured as an "injection point". A flow of mail flats that are spaced apart from one another is transported to a loading device B1, B2. Here, the mail items are preferably standing on a longitudinal edge and are clamped between a plurality of endless conveyor belts.

It is also possible for the input conveyor to have a multiplicity of holding components, for example clamps. In the loading device B1, B2, a holding component respectively repeatedly grips a mail item. The input conveyor transports the holding component with the mail items.

In one embodiment, each loading device is connected to a separating device. The separating device is loaded with a stack of mail items and separates the mail items.

The loading device conveys each mail item one after another into a storage pocket that is guided past the loading device. It is possible for a plurality of mail items to be conveyed simultaneously in a storage pocket.

A data processing control device "knows" the position of each mail item in the apparatus. This position varies with the speed at which the mail item is being transported. The control device records when a mail item passes into a storage pocket, and where the mail item transported in the storage pocket is located. The control device also activates the actuating system of the storage pocket at the correct moment such that the actuating system opens the flap and the mail item or the mail items pass from the storage pocket into an output container. What is meant by "at the correct moment" is explained further below.

A stack with mail items can be removed from the output conveying path 1, 2, 3 at each unloading device E1, E2. As set forth above, in one embodiment each output container is a container that is placed on an endless conveyor belt of the output conveyor path, or is loosely connected to the endless conveyor belt. At the unloading device E1, E2, each filled output container is taken from the conveyor belt, and at its location an empty output container is placed on the conveyor belt.

In another embodiment, each output container is a receiver device that is permanently connected to the holding device of the output conveying path. The receiver device is emptied manually or by an automatic handling system when it is passing the unloading device E1, E2. It is also possible for the filled receiver device to be tilted upon reaching the unloading device E1, E2, and thereby emptied.

The control device has reading access to a computer accessible assignment table. This table lists possible delivery addresses with which the mail items can be provided, and respectively assigns at least one output container to each possible delivery address. A plurality of delivery addresses can be assigned to one output container. The output containers function as sorting end points. The output containers are capable of receiving mail items all having different dimensions.

The control device also "knows" which mail item is provided with which delivery address. This information has been determined by a reading device which preferably comprises a camera, an OCR device and a video coding station. The camera records a digital image of the mail item. The OCR device attempts to decode the delivery address automatically, to which end it evaluates the digital image. If this is not successful, the image is transmitted to the video coding station, and a video coding facility decodes the address in the image and inputs the decoded address completely, or at least partially, for example, the area code or the "ZIP code".

The control device also "knows" where a mail item is currently located. If this post item is located in a storage pocket, and this storage pocket is located precisely in the transfer position over such an output container to which the delivery address of the mail item is assigned the control device activates the actuating system of this storage pocket such that the mail item slides into the receiver container.

Figure 2:
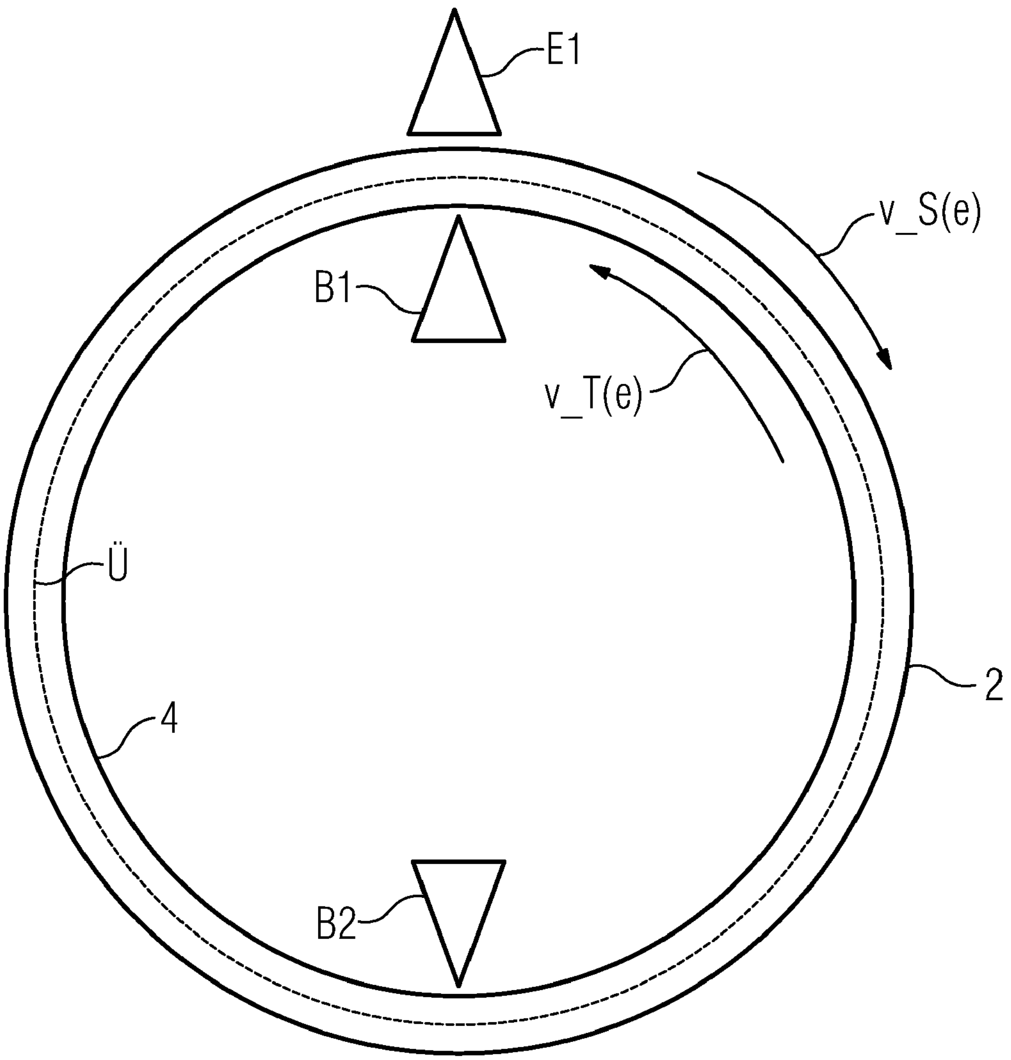
FIG. 2 is a schematic of the apparatus in the input optimized mode.
Figure 3:
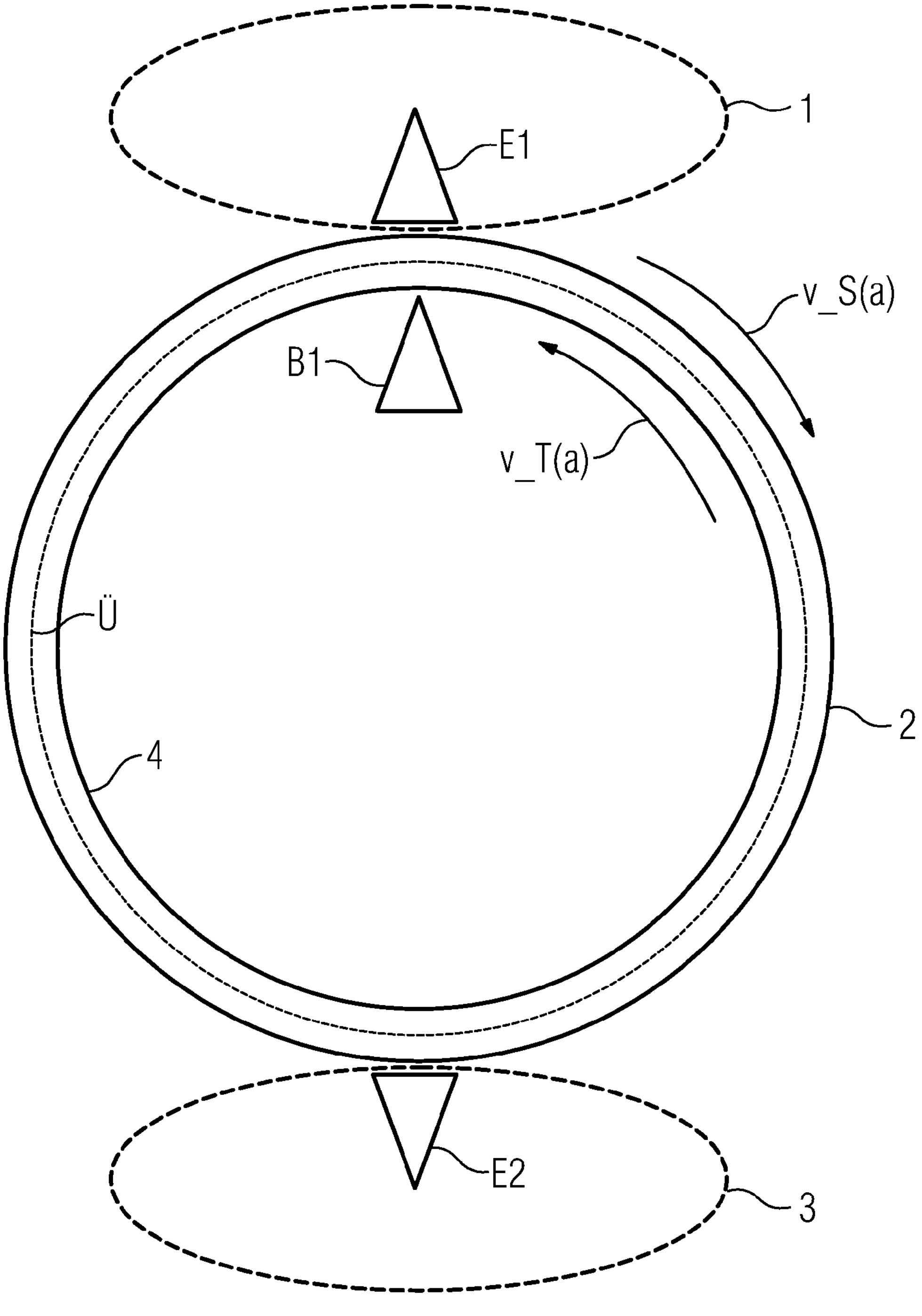
FIG. 3 is a schematic of the apparatus in the output optimized mode.

The mode of operation of the apparatus in the two modes is shown below. FIG. 2 shows the apparatus in the input optimized mode, while FIG. 3 shows it in the output optimized mode.

In the input optimized mode, the two loading devices B1, B2 and one unloading device E1 are activated. The other unloading device E2 is deactivated in the input optimized mode. In the input optimized mode, the apparatus merges two flows of mail items, for example. The mail items of one flow are introduced via one loading device B1 into the pocket conveying path 4, those of the other flow via the other loading device B2.

The output containers traverse only the segment 2 of the output conveyor belt. The storage pockets and output containers are moved at the same speed v_T(e)=v_S(e) in opposite directions.

The apparatus ensures that each storage pocket passes once into a transfer position with reference to each output container. It is then capable of dispensing a mail item in the storage pocket into the correct output container, irrespective of the output container to which the delivery address of the mail item is assigned. In order that the storage pocket can be filled by any loading device B1, B2 with a new mail item irrespective of the delivery address of the mail item, the apparatus is preferably configured such that each storage pocket is guided in empty state past each loading device and filled there. A loading device B1, B2 fills a single mail item or else a plurality of mail items, to whose delivery addresses the same output container is assigned, into this previously empty storage pocket. In order to enable this mode of operation, in the input optimized mode each storage pocket passes at least once into a transfer position on the path from each loading device to every other loading device with reference to each output container of the output conveying path, so that the mail items in this storage pocket can be emptied into this output container.

In the output optimized mode, one loading device B1 and both unloading devices E1, E2 are activated. The other loading device B2 is deactivated in the output optimized mode. Each output container traverses the entire output conveying path, that is to say all three segments 1, 2, 3. The output container holding device is moved at a speed v_S(a) that is higher than the speed v_T(a) at which the pocket holding device is moved. As set forth above, it holds that $$v\_S(a) = \frac{L\_1 + L\_2 + L\_3}{L\_2} * v\_T(a).$$

The storage pockets are in turn moved in the opposite direction like the output containers.

The above described mode of operation is preferably enabled as follows: on its way from one unloading device E1 to the other unloading device E2, as well as on the way from E2 to E1, each output container is brought at least once into the transfer position relative to each storage pocket.

In one refinement, each mail item traverses the apparatus twice. Firstly, the apparatus is operated in the input optimized mode. Two flows of mail items are separated by two separation devices that are connected to the two loading devices B1, B2. Each storage pocket is guided past both loading devices B1, B2. The two loading devices B1, B2 introduce the mail items into storage pockets on the pocket conveying path 4. The mail items pass from these storage pockets into output containers of the container conveying path and are removed from the output conveying path again at the activated unloading device E1.

After all the mail items that have reached the apparatus up to a specific point in time have traversed the apparatus for the first time and been discharged again, the apparatus switches into the output optimized mode. The mail items are fed to the activated loading device B1 via a separating device. A sequence is observed during feeding among the output containers; the mail items are fed in accordance with this sequence. In the second sorting run, the activated loading device B1 fills storage pockets with the mail items. From there, the mail items pass into output containers of the container conveying path. Each output container is guided past both unloading devices E1, E2, where mail items are removed from the container conveying path.

LIST OF REFERENCE SYMBOLS

| Reference symbol | Meaning |
|---|---|
| 1 | 1st segment of the output conveying path |
| 2 | 2nd segment of the output conveying path |
| 3 | 3rd segment of the output conveying path |
| 4 | Pocket conveying path |
| B1 | Loading device, activated in the output optimized mode |
| B2 | Further loading device, deactivated in the output optimized mode |
| E1 | Unloading device, activated in the input optimized mode |
| E2 | Further unloading device, deactivated in the input optimized mode |
| L_1 | Length of segment 1 of the output conveying path |
| L_2 | Length of segment 2 of the output conveying path |
| L_3 | Length of segment 3 of the output conveying path |
| Ü | Transfer area |
| v_S(a) | Speed at which the output conveying path is moved in the output optimized mode |
| v_S(e) | Speed at which the output conveying path is moved in the input optimized mode |
| v_T(a) | Speed at which the pocket conveying path is moved in the output optimized mode |
| v_T(e) | Speed at which the pocket conveying path is moved in the input optimized mode |

The invention claimed is:

1. An apparatus for sorting objects, the apparatus comprising:

an input conveyor;

an output conveyor;

at least two loading devices;

at least two unloading devices; and a drive, said input conveyor being configured to transport at least one object from one of said loading devices to a transfer area;

said output conveyor being configured to transport at least one object from the transfer area to one of said unloading devices;

said input conveyor and said output conveyor overlapping one another in at least one transfer area for transferring a sorted object from said input conveyor to said output conveyor;

each of said loading devices being configured for filling said input conveyor with at least one object when said input conveyor is guided past said loading device;

each of said unloading devices being configured for removing at least one object located on said output conveyor from said output conveyor;

said drive being configured for guiding said input conveyor past at least one of said loading devices, for guiding said output conveyor past at least one of said unloading devices, and for moving said input conveyor relative to said output conveyor;

said apparatus being switchable between an input optimized mode and an output optimized mode, wherein in the input optimized mode:

said at least two loading devices and one of said unloading devices being activated; and said apparatus being configured for guiding said input conveyor past both said at least two loading devices and said output conveyor past the activated one of said unloading devices; and in the output optimized mode:

one of said loading devices and both of said unloading devices being activated; and said apparatus being configured for guiding said input conveyor past the activated one of said loading devices and said output conveyor past both of said unloading devices.

2. The apparatus according to claim 1, wherein an other of said unloading devices is deactivated in the input optimized mode; and an other of said loading devices is deactivated in the output optimized mode.

3. The apparatus according to claim 1, wherein said input conveyor includes a plurality of holding components;

each of said holding components is configured to hold at least one object to be sorted during transport to the transfer area; and said apparatus is configured so that in the input optimized mode each of said holding components traverses the transfer area at least partially on its way from said one loading device to said other loading device.

4. The apparatus according to claim 1, wherein
said output conveyor includes a plurality of receiver components;
each of said receiver components is configured to receive at least one object to be sorted during transport to one of said unloading devices; and
said apparatus is configured so that in the output optimized mode each of said receiver components traverses said transfer area at least partially on its way from said one unloading device to each said other unloading device.

5. The apparatus according to claim 1, wherein
said input conveyor includes a plurality of holding components;
each of said holding components is configured to hold at least one object to be sorted during transport to the transfer area;
said output conveyor including a plurality of receiver components;
each of said receiver component is configured to receive at least one object to be sorted during transport to one of said unloading devices; and
said apparatus is configured such that
in the input optimized mode, on its way from said one loading device to said other loading device, each of said holding components passes at least once in relation to each of said receiver components into a transfer position in which each object is transferred from said holding component into said receiver component; and
in the output optimized mode, on its way from said one unloading device to said other unloading device, each of said receiver components passes at least once in relation to each of said holding components into the transfer position.

6. The apparatus according to claim 1, wherein
said input conveyor is configured
to transport objects along an input optimized conveying path in the input optimized mode; the input optimized conveying path is guided past both said loading devices; and
to transport objects along an output optimized conveying path in the output optimized mode; the output optimized conveying path is guided only past the activated one of said loading devices.

7. The apparatus according to claim 6, wherein
said drive is configured to guide said input conveyor at a speed more quickly past said loading devices in the input optimized mode than in the output optimized mode, such that the speed at which it passes compensates for a longer conveying path that said input conveyor traverses in the input optimized mode.

8. The apparatus according to claim 1, wherein
said output conveyor is configured
to transport objects along an output optimized conveying path in the output optimized mode, the output optimized conveying path being guided past both of said unloading devices; and
to transport objects along an input optimized conveying path in the input optimized mode, the input optimized conveying path being guided only past the activated one of said unloading device.

9. The apparatus according to claim 8, wherein
said drive is configured to guide said output conveyor at a speed more quickly past said unloading devices in the output optimized mode than in the input optimized mode, so that the speed at which it passes compensates for a longer conveying path that said output conveyor traverses in the output optimized mode.

10. The apparatus according to claim 1, wherein
said drive is configured to move said input conveyor and said output conveyor so that said input conveyor and said output conveyor move along the transfer area in opposite directions.

11. A method for sorting objects, using an apparatus having first and second loading devices and first and second unloading devices, the method comprising the steps of:
sorting the objects in an input optimized mode or in an output optimized mode;
the input optimized mode including the steps of
activating both loading devices and one of said unloading devices;
guiding an input conveyor past both loading devices;
passing each object to be sorted from one of the loading devices to the input conveyor;
transporting the objects being sorted on the input conveyor to a transfer area;
passing the object to be sorted in the transfer area from the input conveyor to an output conveyor;
guiding the output conveyor an activated one of the unloading devices;
guiding the object being sorted on the output conveyor past an activated one of the unloading devices; and
removing the object to be sorted from the output conveyor when the object is guided past the unloading device; and
the output optimized mode including the steps of
activating one loading device and both unloading devices;
guiding the input conveyor past the activated one of the loading devices;
passing each object being sorted from the activated one of the loading devices to the input conveyor;
transporting the object being sorted on the input conveyor to a transfer area;
passing the object being sorted in the transfer area from the input conveyor to the output conveyor;
passing the output conveyor by both unloading devices; and
removing the object being sorted from the output conveyor when the object is guided past an unloading device.

12. The method according to claim 11, wherein
the input conveyor includes a plurality of holding components;
guiding each holding component past both loading devices in the input optimized mode;
guiding each holding component past the activated one of the loading devices in the output optimized mode; and
in both modes each holding component respectively holds at least one object to be sorted during transport to the transfer area.

13. The method according to claim 11, wherein
the output conveyor includes a plurality of receiver components;
guiding each receiver component past an activated one of the unloading devices in the input optimized mode;
guiding each receiver component past both of the unloading devices in the output optimized mode; and
in both modes each receiver component respectively receives at least one object to be sorted during transport from the transfer area to an unloading device.

14. The method according to claim 11, wherein
the input conveyor includes a plurality of holding components;

each holding component respectively holds at least one object to be sorted during transport to the transfer area;

the output conveyor includes a plurality of receiver components;

each receiver component respectively receives at least one object to be sorted during transport to an unloading device; and in the input optimized mode on its way from each loading device to each other loading device passing each holding component at least once in relation to each receiver component into a transfer position in which each object can be transferred from the holding component into the receiver component; and in the output optimized mode on its way from one unloading device to each other unloading device passing each receiver component in relation to each holding component at least once into the transfer position.

15. The method according to claim 11, including the step of first sorting objects in the input optimized mode; and subsequently sorting objects in the output optimized mode.

* * * * *